US012597713B2

(12) United States Patent
Yang et al.

(10) Patent No.: US 12,597,713 B2
(45) Date of Patent: Apr. 7, 2026

(54) INTELLIGENT SURFACE AND SPATIAL ELECTROMAGNETIC WAVE MANIPULATION SYSTEM

(71) Applicant: ZTE CORPORATION, Shenzhen (CN)

(72) Inventors: Jun Yang, Shenzhen (CN); Yijian Chen, Shenzhen (CN); Jianwu Dou, Shenzhen (CN); Min Fang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 475 days.

(21) Appl. No.: 18/547,012

(22) PCT Filed: Jan. 30, 2022

(86) PCT No.: PCT/CN2022/075227
§ 371 (c)(1),
(2) Date: Aug. 18, 2023

(87) PCT Pub. No.: WO2022/174738
PCT Pub. Date: Aug. 25, 2022

(65) Prior Publication Data
US 2024/0137076 A1    Apr. 25, 2024
US 2024/0235620 A9    Jul. 11, 2024

(30) Foreign Application Priority Data

Feb. 22, 2021    (CN) .......................... 202110198942.5

(51) Int. Cl.
*H01Q 15/14*       (2006.01)
*H01Q 3/46*        (2006.01)
(Continued)

(52) U.S. Cl.
CPC ............. *H01Q 15/148* (2013.01); *H01Q 3/46* (2013.01); *H01Q 15/002* (2013.01);
(Continued)

(58) Field of Classification Search
CPC ........ H01Q 3/44; H01Q 3/46; H01Q 15/0006; H01Q 15/0013; H01Q 15/002;
(Continued)

(56) References Cited

U.S. PATENT DOCUMENTS

2012/0075692 A1    3/2012   Baik et al.
2016/0233971 A1    8/2016   Fink et al.
(Continued)

FOREIGN PATENT DOCUMENTS

CN          111817768 A      10/2020
CN          111930052 A      11/2020
(Continued)

OTHER PUBLICATIONS

Extended European Search Report in Application No. 22755511.7, dated Jan. 8, 2025, 9 pages.
(Continued)

*Primary Examiner* — Robert Karacsony
(74) *Attorney, Agent, or Firm* — Morgan, Lewis & Bockius LLP

(57)                 ABSTRACT

Provided are an intelligent surface and a spatial electromagnetic wave manipulation system. The intelligent surface includes M types of electromagnetic units, where M is greater than or equal to 2. The M types of electromagnetic units are distinguished by at least one of the following: the geometric shape of the electromagnetic unit, the manipulation manner of the electromagnetic unit or the type of an electromagnetic parameter manipulated by the electromagnetic unit.

12 Claims, 8 Drawing Sheets

(51) Int. Cl.
    *H01Q 15/00*     (2006.01)
    *H04B 7/04*     (2017.01)

(52) U.S. Cl.
    CPC ..... *H01Q 15/0026* (2013.01); *H01Q 15/0086*
           (2013.01); *H04B 7/04013* (2023.05)

(58) Field of Classification Search
    CPC ........... H01Q 15/0026; H01Q 15/0053; H01Q
           15/0086; H01Q 15/0093; H01Q 15/148;
                     H04B 7/04013
    See application file for complete search history.

(56)                References Cited

U.S. PATENT DOCUMENTS

| | | |
|---|---|---|
| 2019/0363448 A1 | 11/2019 | Yemelong et al. |
| 2020/0028262 A1 | 1/2020 | Fang |
| 2024/0106131 A1* | 3/2024 | Rafique .............. H04B 7/04013 |

FOREIGN PATENT DOCUMENTS

| | | |
|---|---|---|
| CN | 111930053 A | 11/2020 |
| CN | 112073091 A | 12/2020 |

OTHER PUBLICATIONS

International Search Report in Application No. PCT/CN2022/075227, dated Mar. 29, 2022, 4 page, including translation.

* cited by examiner

| 51 | 53A | 51 | 53B | 50 | 53C |
|----|-----|----|-----|----|-----|
| 54 | 52A | 54 | 52B | 54 | 52C |
| 51 | 53A | 51 | 53C | 50 | 53B |

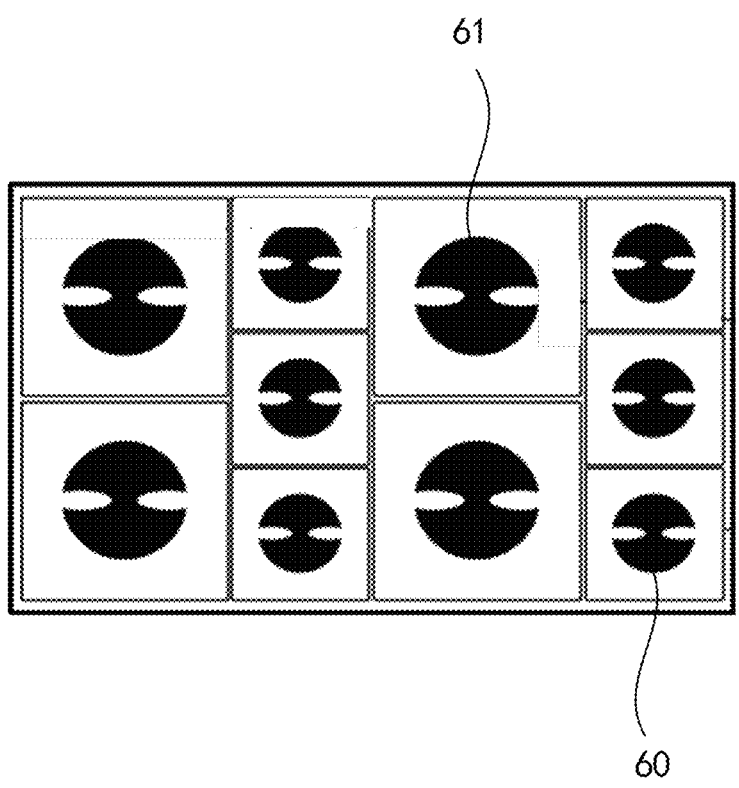
FIG. 6
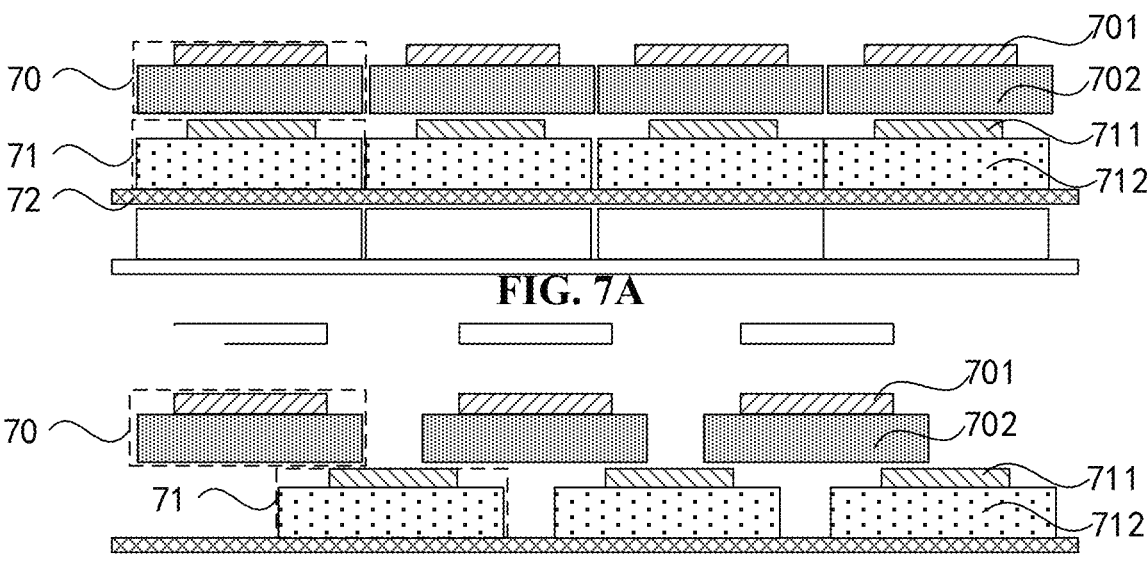
FIG. 7A
FIG. 7B

INTELLIGENT SURFACE AND SPATIAL ELECTROMAGNETIC WAVE MANIPULATION SYSTEM

CROSS-REFERENCE TO RELATED APPLICATIONS

This is a National Stage Application, filed under 35 U.S.C. 371, of International Patent Application No. PCT/CN2022/075227, filed on Jan. 30, 2022, which claims priority to Chinese Patent Application No. 202110198942.5 filed with the China National Intellectual Property Administration (CNIPA) on Feb. 22, 2021, the disclosures of which are incorporated herein by reference in their entireties.

TECHNICAL FIELD

The present application relates to the field of communication technologies, for example, an intelligent surface and a spatial electromagnetic wave manipulation system.

BACKGROUND

The intelligent surface (IS) is a new concept proposed in the field of wireless communication in recent years. Due to the potential for intelligent manipulation of spatial electromagnetic environment and the advantages of low profile and low costs, the intelligent surface is expected to become a key technology for the 6th generation (6G) wireless communications.

However, the current intelligent surface includes the same type of electromagnetic units and the capability of the intelligent surface for manipulating spatial electromagnetic wave signals is insufficient, as a result, the capability of the intelligent surface for manipulating the spatial electromagnetic environment cannot be fully exploited.

SUMMARY

Embodiments of the present application provide an intelligent surface and a spatial electromagnetic wave manipulation system, aiming to implement an intelligent surface with the greatly improved capability of manipulating spatial electromagnetic wave signals and the spatial electromagnetic environment.

An embodiment of the present application provides an intelligent surface.

The intelligent surface includes M types of electromagnetic units, where M is greater than or equal to 2.

The M types of electromagnetic units are distinguished by at least one of a geometric shape of an electromagnetic unit, a manipulation manner of an electromagnetic unit or a type of an electromagnetic parameter manipulated by an electromagnetic unit.

An embodiment of the present application further provides a spatial electromagnetic wave manipulation system including the intelligent surface according to the preceding technical scheme.

The spatial electromagnetic wave manipulation system further includes a first node and a second node. The first node is configured to emit electromagnetic wave signals to space and/or receive electromagnetic wave signals from space, and the second node is configured to emit electromagnetic wave signals to space and/or receive electromagnetic wave signals from space.

The intelligent surface is configured to manipulate electromagnetic wave signals emitted by the first node and reflect or transmit the manipulated electromagnetic wave signals to the second node; and/or the intelligent surface is further configured to manipulate electromagnetic wave signals emitted by the second node and reflect or transmit the manipulated electromagnetic wave signals to the first node.

The intelligent surface provided in the embodiment includes at least two types of electromagnetic units; compared with an intelligent surface including only one type of electromagnetic units, the technology in the embodiment can provide more combinations of amounts of changes in at least one of four properties, that is, the phase, the amplitude, the polarization direction and the frequency, of an electromagnetic wave signal. Moreover, with an increase in the types of electromagnetic units and different arrangement manners of different types of electromagnetic units on the intelligent surface, the intelligent surface performs more precise manipulation on at least one of the phase, the amplitude, the polarization direction or the frequency of the electromagnetic wave signal, so that the capability of the intelligent surface for manipulating spatial electromagnetic wave signals is improved, and thus an intelligent surface with the greatly improved capability of manipulating spatial electromagnetic wave signals and the spatial electromagnetic environment is implemented. In addition, the intelligent surface with the same number of electromagnetic units can have a stronger manipulation capability, and the intelligent surface in the embodiment also has the effect of reducing production costs.

BRIEF DESCRIPTION OF DRAWINGS

FIG. 6 is a structural diagram of another intelligent surface according to an embodiment of the present application;

FIG. 7A is a structural diagram of another intelligent surface according to an embodiment of the present application;

FIG. 7B is a structural diagram of another intelligent surface according to an embodiment of the present application.

DETAILED DESCRIPTION

It is to be understood that the embodiments described herein are intended to explain and not to limit the present application.

In the subsequent description, suffixes such as "module", "component" or "unit" used for representing components are only intended to facilitate the explanation of the present application and have no particular meaning in themselves. Therefore, "module", "components" or "unit" may be used in a mixed manner.

An intelligent surface includes the same type of electromagnetic units. As a result, the intelligent surface has an insufficient capability of manipulating spatial electromagnetic wave signals so that the capability of the intelligent surface for manipulating the spatial electromagnetic environment cannot be fully exploited. The reason for this is that only one type of electromagnetic units are used in the related art, that is, the electromagnetic units have the same geometric shape, the same manipulation manner and the same type of electromagnetic parameters manipulated by the electromagnetic units. Therefore, the intelligent surface in the related art has the insufficient capability of manipulating spatial electromagnetic wave signals so that the capability of the intelligent surface for manipulating the spatial electromagnetic environment cannot be fully exploited.

An embodiment of the present application provides an intelligent surface, aiming to implement an intelligent surface whose capability for manipulating incident electromagnetic waves has a relatively large increase, thus the capability of the intelligent surface for manipulating the spatial electromagnetic environment is greatly improved.

Figure 1A:
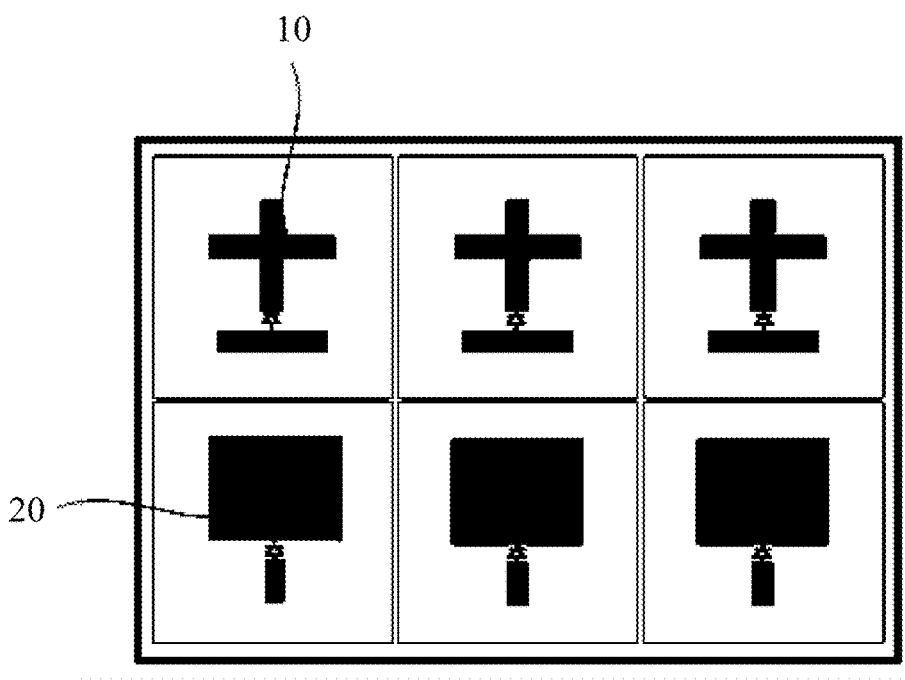
FIG. 1A is a structural diagram of an intelligent surface according to an embodiment of the present application.
Figure 1B:
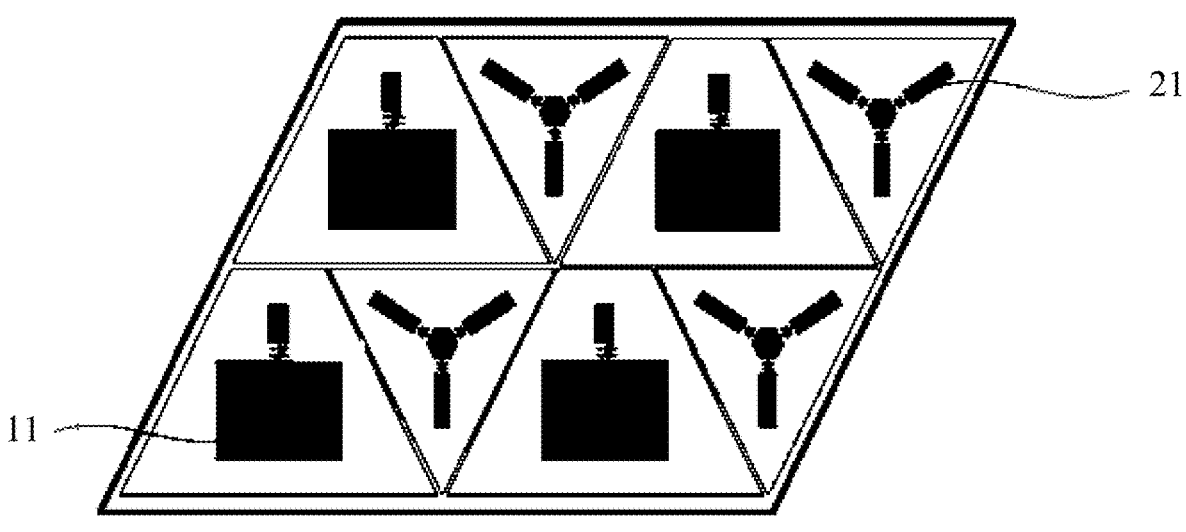
FIG. 1B is a structural diagram of another intelligent surface according to an embodiment of the present application.

FIG. 1A and FIG. 1B are structural diagrams of an intelligent surface according to an embodiment of the present application. FIG. 2A to FIG. 2D are structural diagrams of an electromagnetic unit according to an embodiment of the present application. Referring to FIG. 1A and FIG. 1B, the intelligent surface includes M types of electromagnetic units, where M is greater than or equal to 2. The M types of electromagnetic units are distinguished by at least one of a geometric shape of an electromagnetic unit, a manipulation manner of an electromagnetic unit or a type of an electromagnetic parameter manipulated by an electromagnetic unit.

Referring to FIG. 2A to FIG. 2D, an electromagnetic unit includes a dielectric material layer 2 and a patch layer 1 located on a first surface of the dielectric material layer 2.

Referring to FIG. 1A to FIG. 1B and FIG. 2A to FIG. 2D, in the intelligent surface shown in FIG. 1A, the value of M is 2, that is, the intelligent surface includes two types of electromagnetic units, that is, electromagnetic units 10 and electromagnetic units 20. An electromagnetic unit 10 and an electromagnetic unit 20 have different shapes of patch layers 1, thus belonging to different types of electromagnetic units. In the intelligent surface shown in FIG. 1*i*, the value of M is 2, that is, the intelligent surface includes two types of electromagnetic units, that is, electromagnetic units 11 and electromagnetic units 21. An electromagnetic unit 11 and an electromagnetic unit 21 have different shapes of patch layers, and the shape of the electromagnetic unit 11 and the shape of the electromagnetic 21 are also different, thus the electromagnetic unit 11 and the electromagnetic unit 20 belong to different electromagnetic units. It is to be noted that patch layers 1 in electromagnetic units having different shapes, different partial or total sizes and different placement positions of cross-sectional shapes relative to a certain center may all lead to different geometric shapes of the electromagnetic units. In the intelligent surface shown in FIG. 1A and FIG. 1B, different shapes of patch layers 1 of different electromagnetic units lead to different geometric shapes of the electromagnetic units. The shape of the patch layer 1 of the electromagnetic unit includes a circle or a polygonal shape such as a triangle, a trapezoid and a hexagon. The shape of the patch layer 1 is not limited in the embodiments of the present application. Different types of electromagnetic units have different manipulation effects on the same incident electromagnetic wave. An intelligent surface formed by different types of electromagnetic units can more efficiently and accurately manipulate electromagnetic waves.

The control manner of an electromagnetic unit may include at least one of electronic component control, liquid crystal control or micro-electromechanical system control.

In an embodiment, the M types of electromagnetic units include $K_5$ types of electromagnetic units controlled by electronic components, $K_6$ types of electromagnetic units controlled by liquid crystals and $K_7$ types of electromagnetic units controlled by a micro-electromechanical system, where $K_5 \geq 0$, $K_6 \geq 0$, $K_7 \geq 0$, and $K_5 + K_6 + K_7 = M$.

When an electronic component is used for control, the input level of the electronic component may be changed through a control circuit. The electronic component changes the state of the electronic component in response to the input level, thereby adjusting the electromagnetic property of the entire electromagnetic unit. When a liquid crystal is used for control, the voltage difference between two sides of liquid crystal material may be adjusted so that the arrangement state of liquid crystal molecules is changed and thus the dielectric constant of the liquid crystal material is changed; therefore, the electromagnetic property of the entire electromagnetic unit is adjusted. A micro-electromechanical system may be a micro-electromechanical motor or a micro-electromechanical switch. The input level of the micro-electromechanical system is changed through a control circuit, and the micro-electromechanical system changes the state of the micro-electromechanical system in response to the input level, thereby adjusting the electromagnetic property of the entire electromagnetic unit. The micro-electromechanical motor may change the rotation direction and rotation speed of the output shaft in response to the input level, and the micro-electromechanical switch may change the internal connection state of the electromagnetic unit, so that the electromagnetic property of the entire electromagnetic unit is adjusted. Electromagnetic units with different properties have different manipulation effects on an incident electromagnetic wave signal, that is, change amounts in at least one of four properties, that is, the phase, the amplitude, the polarization direction or the frequency, of the electromagnetic wave signal are different.

Figure 2A:
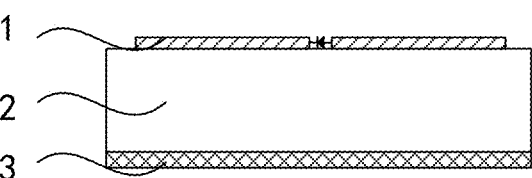
FIG. 2A is a structural diagram of an electromagnetic unit according to an embodiment of the present application.
Figure 2B:
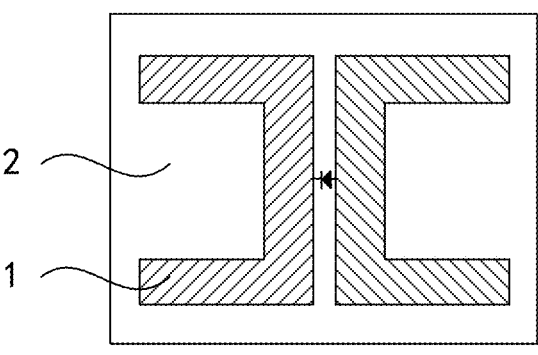
FIG. 2B is a structural diagram of another electromagnetic unit according to an embodiment of the present application.
Figure 2C:
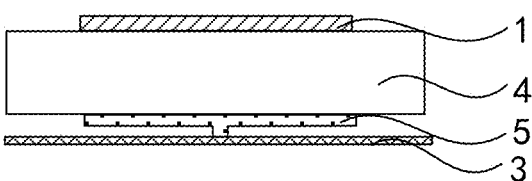
FIG. 2C is a structural diagram of another electromagnetic unit according to an embodiment of the present application.
Figure 2D:
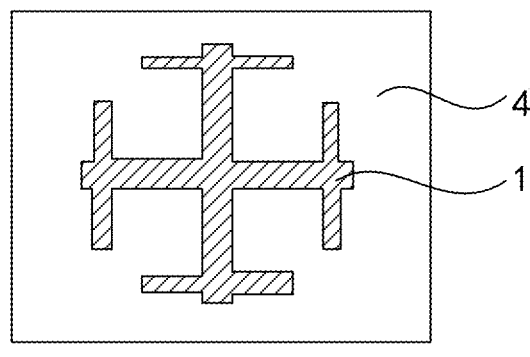
FIG. 2D is a structural diagram of another electromagnetic unit according to an embodiment of the present application.

FIG. 2A and FIG. 2B show structural diagrams of an electromagnetic unit controlled by an electronic component. FIG. 2C and FIG. 2D show an electromagnetic unit controlled by a liquid crystal. Referring to FIG. 2A and FIG. 2B, the electromagnetic unit includes a dielectric material layer 2 and a patch layer 1 located on the first surface of the dielectric material layer 2. Referring to FIG. 2C and FIG. 2D, the electromagnetic unit controlled by the liquid crystal includes a liquid crystal layer 4, a patch layer 1 located on the first surface of the liquid crystal layer 4 and an electrode layer 5 located on a second surface opposite to the first surface. It is to be noted that when the electromagnetic unit is used for electromagnetic wave transmission, no ground plate 3 is required. When the electromagnetic unit is used for electromagnetic wave reflection, a ground plate 3 needs to be set for reflecting the electromagnetic wave incident from the patch layer 1. For the electromagnetic units shown in FIG. 2A and FIG. 2B, the level signal received by a diode used as the electronic component may control the on/off state of the diode so that the property of the electromagnetic unit is changed. However, the electronic component control in the embodiments of the present application is not limited to diode control, but may also include resistor control, capacitor control, diode control and triode control. Varactor diode control may achieve multi-level phase control. In the electromagnetic units in FIG. 2C and FIG. 2D, the level signal between the patch layer 1 and the electrode layer 5 may control the rotation direction of liquid crystal molecules in the liquid crystal layer 4, so that the property of the electromagnetic unit is changed. The patch layer 1 may include one or multiple layers of patches, and the same layer of patches include at least one patch. The connection state between patches may be controlled by the electronic component or the micro-electromechanical system. Exemplarily, referring to FIG. 1A and FIG. 1i, different patches are connected through the electronic component. Patches in FIG. 1A are connected through diodes, and patches in FIG. 1B are connected through capacitors or diodes.

The type of electromagnetic parameters manipulated by the electromagnetic unit includes at least one of the phase, the amplitude, the polarization direction or the frequency. In an embodiment, the M types of electromagnetic units include $K_8$ types of electromagnetic units for manipulating the electromagnetic wave amplitude, $K_9$ types of electromagnetic units for manipulating the electromagnetic wave phase, $K_{10}$ types of electromagnetic units for manipulating the electromagnetic wave frequency and $K_{11}$ types of electromagnetic units for manipulating the electromagnetic wave polarization direction, where $K_8 \geq 0$, $K_9 \geq 0$, $K_{10} \geq 0$, $K_{11} \geq 0$, and $K_8 + K_9 + K_{10} + K_{11} = M$.

Electromagnetic units with at least one of different geometric shapes of electromagnetic units, different manipulation manners of electromagnetic units or different types of electromagnetic parameters manipulated by electromagnetic units have different properties and thus have different manipulation effects on the incident electromagnetic wave signal, that is, change amounts in at least one of the four properties, that is, the phase, the amplitude, the polarization direction or the frequency, of the electromagnetic wave signal are different. Therefore, the intelligent surface provided in the embodiment includes at least two types of electromagnetic units; compared with an intelligent surface including only one type of electromagnetic units, the technology in the embodiment can provide more combinations of change amounts in at least one of the four properties, that is, the phase, the amplitude, the polarization direction or the frequency, of the electromagnetic wave signal. Moreover, with an increase in the types of electromagnetic units and different arrangement manners of different types of electromagnetic units on the intelligent surface, the intelligent surface performs more precise manipulation on at least one of the phase, the amplitude, the polarization direction or the frequency of the electromagnetic wave signal, so that the capability of the intelligent surface for manipulating spatial electromagnetic wave signals is improved, and thus an intelligent surface with the greatly improved capability of manipulating the spatial electromagnetic wave signal and the spatial electromagnetic environment is implemented. In addition, an intelligent surface with the same number of electromagnetic units can have a stronger manipulation capability, and the intelligent surface in the embodiment also has the effect of reducing production costs.

It is to be noted that electromagnetic units shown in FIG. 1A are square, and electromagnetic units shown in FIG. 2A to FIG. 2D are triangular and trapezoidal. The overall shape of the electromagnetic unit and the overall shape of the intelligent surface are not limited in the embodiments of the present application.

Figure 3A:
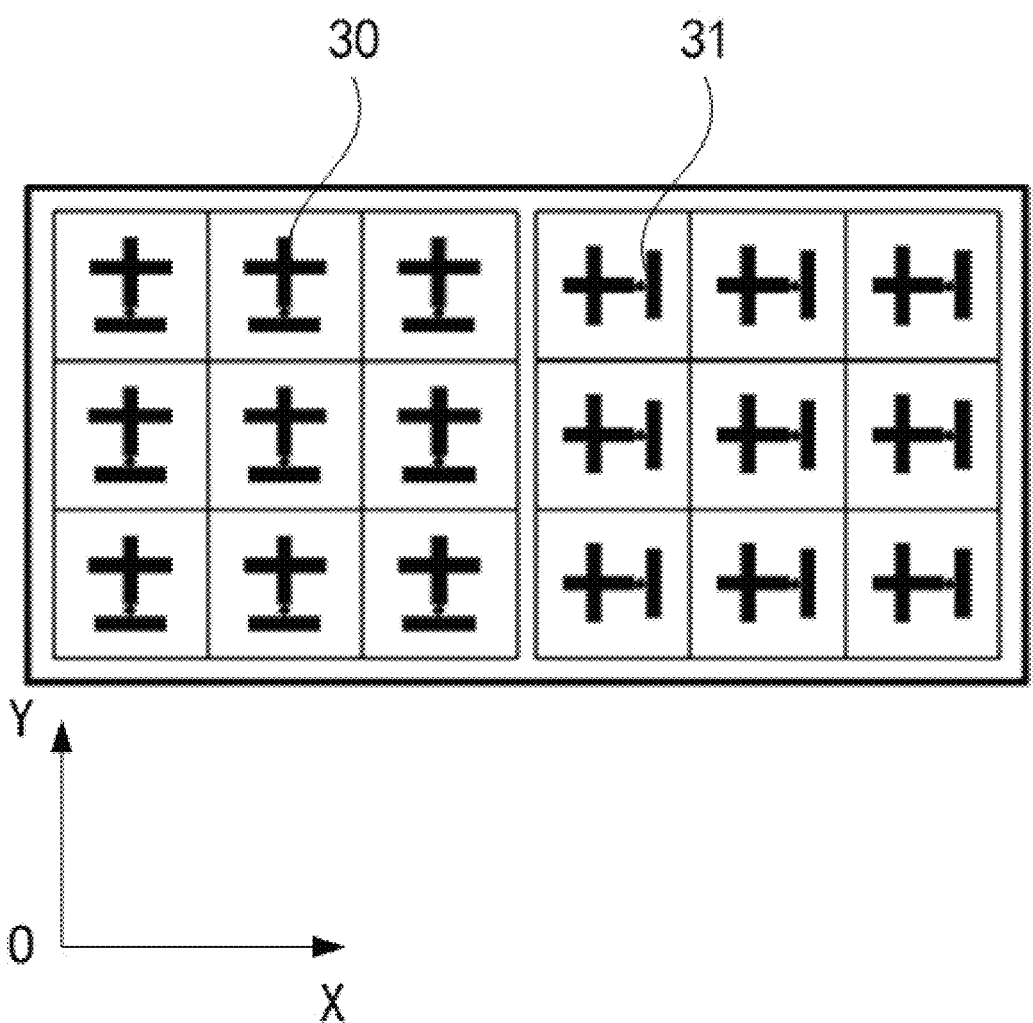
FIG. 3A is a structural diagram of another intelligent surface according to an embodiment of the present application.
Figure 3B:
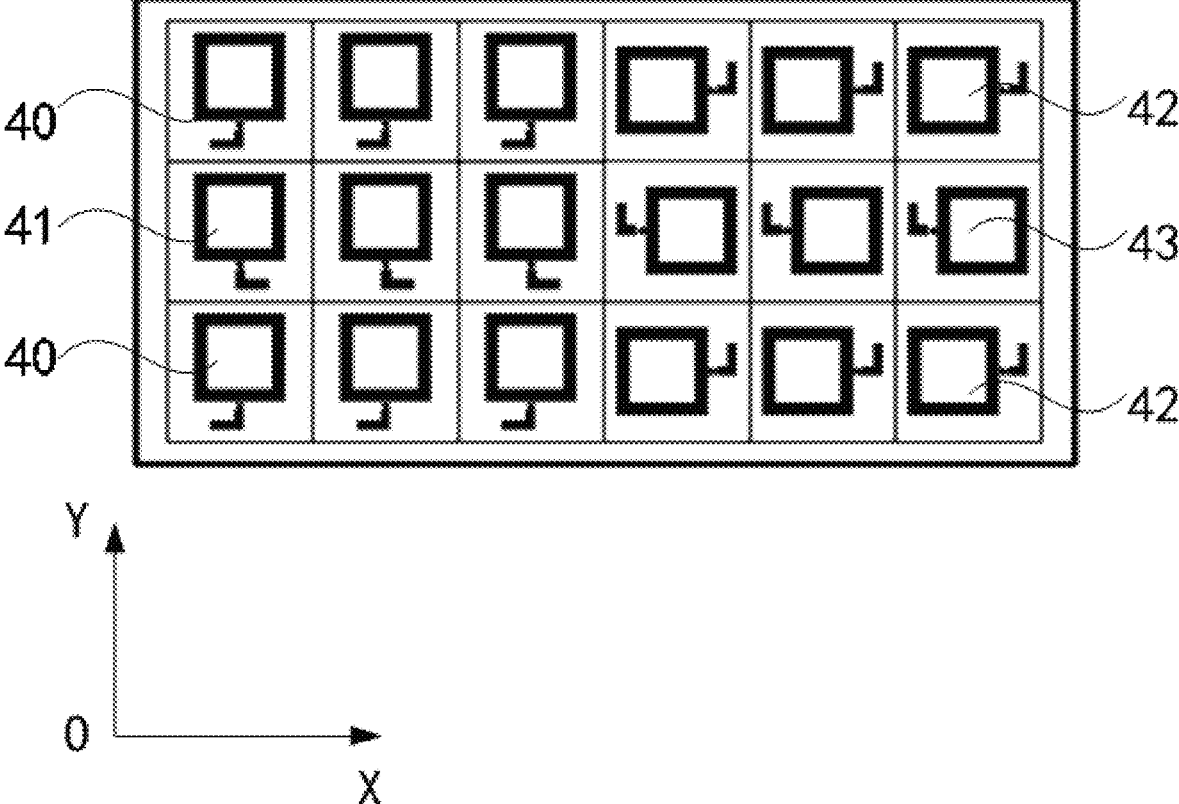
FIG. 3B is a structural diagram of another intelligent surface according to an embodiment of the present application.
Figures 3C, 3D:
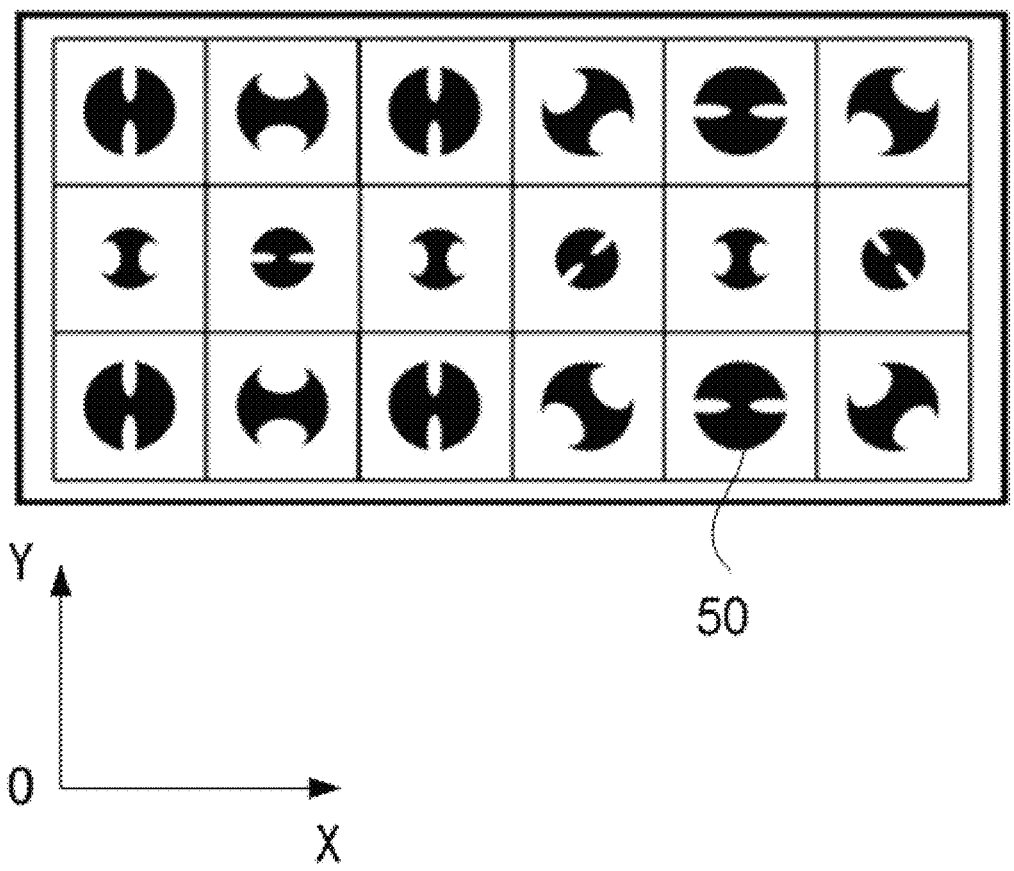
FIG. 3C is a structural diagram of another intelligent surface according to an embodiment of the present application.
FIG. 3D is a diagram showing numerals corresponding to electromagnetic units in FIG. 3C.

Electromagnetic units having different geometric shapes are described in detail below. FIG. 3A to FIG. 3C are structural diagrams of another intelligent surface according to an embodiment of the present application. FIG. 3A, FIG. 3B, and FIG. 3C show different intelligent surfaces, and numerals in FIG. 3D are marks corresponding to positions of electromagnetic units in FIG. 3C. It is to be noted that in the intelligent surface shown in FIG. 1A and FIG. 1B, patch layers 1 of different electromagnetic units have different shapes. Patches of electromagnetic units shown in FIG. 3A to FIG. 3C have the same shape, the patch or the entire electromagnetic unit is rotated by a preset angle relative to the center of the basic electromagnetic unit to form a transformed electromagnetic unit; and/or, the patch or the basic electromagnetic unit is mirror-flipped relative to a preset flipping axis on the plane where the basic electromagnetic unit is located to form a transformed electromagnetic unit.

Referring to FIG. 3A to FIG. 3C, the M types of electromagnetic units include P types of basic electromagnetic units and Q types of transformed electromagnetic units, where $P \geq 1$, $Q \geq 1$ and $P+Q=M$, or $P=M$ and $Q=0$. A basic electromagnetic unit is rotated by a preset angle relative to the center of the basic electromagnetic unit so that a transformed electromagnetic unit is formed; and/or, a basic electromagnetic unit is mirror-flipped relative to a preset flipping axis on the plane where the basic electromagnetic unit is located so that a transformed electromagnetic unit is formed.

Exemplarily, referring to FIG. 3A, the value of P is 1, the value of Q is 1, an electromagnetic unit 30 is a basic electromagnetic unit, and an electromagnetic unit 31 is a transformed electromagnetic unit. The electromagnetic unit 31 is formed by rotating the electromagnetic unit 30 by 900 counterclockwise relative to the center of the electromagnetic unit 30.

Referring to FIG. 3B, the value of P is 1, the value of Q is 3, an electromagnetic unit 40 is a basic electromagnetic unit, and an electromagnetic unit 41, an electromagnetic unit 42 and an electromagnetic unit 43 are transformed electromagnetic units. The electromagnetic unit 40 is mirror-flipped relative to a flipping axis parallel to the y-axis on the XOY plane where the electromagnetic unit 40 is located so that the electromagnetic unit 41 is formed. On the basis of mirror-flipping relative to the flipping axis parallel to the y-axis on the XOY plane where the electromagnetic unit 40 is located, the electromagnetic unit 40 is further rotated by 90° counterclockwise to form the electromagnetic unit 42. The electromagnetic unit 40 is rotated by 90° clockwise relative to the center of the electromagnetic unit 40 to form the electromagnetic unit 43.

Referring to FIG. 3C, the value of P is 1, the value of Q is 8, an electromagnetic unit 50 is a basic electromagnetic unit, and an electromagnetic unit 51, an electromagnetic unit 52A, an electromagnetic unit 52B, an electromagnetic unit 52C, an electromagnetic unit 53A, an electromagnetic unit 53B, an electromagnetic unit 53C and an electromagnetic unit 54 are transformed electromagnetic units. The electromagnetic unit 51 is formed by rotating the electromagnetic unit 50 by 90° clockwise relative to the center of the electromagnetic unit 50. Types of various electromagnetic units in FIG. 3C are shown in FIG. 3D.

A basic electromagnetic unit is rotated by a preset angle relative to the center of the basic electromagnetic unit so that a transformed electromagnetic unit is formed; and/or a basic electromagnetic unit is mirror-flipped relative to a preset flipping axis on the plane where the basic electromagnetic unit is located so that a transformed electromagnetic unit is formed. The transformed electromagnetic unit and the basic electromagnetic unit have different geometric shapes to form an intelligent surface having M types of electromagnetic units. Therefore, the capability of this intelligent surface for manipulating spatial electromagnetic wave signals is improved, and thus an intelligent surface with the greatly improved capability of manipulating the spatial electromagnetic wave signals and the spatial electromagnetic environment is implemented. Moreover, the transformed electromagnetic unit is obtained by deforming the basic electromagnetic unit, and the complexity of designing different types of electromagnetic units is reduced.

In an embodiment, on the basis of the preceding technical schemes, the M types of electromagnetic units include P types of basic electromagnetic units and Q types of transformed electromagnetic units, where $P \geq 1$, $Q \geq 1$ and $P+Q=M$, or $P=M$ and $Q=0$. The overall size of the patch layer of a basic electromagnetic unit is enlarged or reduced according to a preset proportion so that a transformed electromagnetic unit is formed; and/or the overall size of a basic electromagnetic unit is enlarged or reduced according to a preset proportion so that a transformed electromagnetic unit is formed.

Referring to FIG. 3C, the value of P is 1, and the value of Q is 8. The electromagnetic unit 50 is a basic electromagnetic unit, and the electromagnetic unit 51, the electromagnetic unit 52A, the electromagnetic unit 52B, the electromagnetic unit 52C, the electromagnetic unit 53A, the electromagnetic unit 53B, the electromagnetic unit 53C and the electromagnetic unit 54 are transformed electromagnetic units. The transformed electromagnetic unit 52A is formed by reducing the overall size of the patch layer of the electromagnetic unit 50 according to a preset proportion; and/or the transformed electromagnetic unit 52A is formed by reducing the overall size of the electromagnetic unit 50 according to a preset proportion.

On the basis of reducing the overall size of the patch layer of the electromagnetic unit 50 according to the preset proportion, the electromagnetic unit 50 is further rotated by preset angles relative to the center of the electromagnetic unit 50 so that the electromagnetic unit 52B and the electromagnetic unit 52C are formed.

It is to be noted that FIG. 3C only shows the case where the overall size of the patch layer of the basic electromagnetic unit is reduced according to a preset proportion so that the transformed electromagnetic unit is formed; and/or the overall size of the basic electromagnetic unit is reduced according to a preset proportion so that the transformed electromagnetic unit is formed. However, the embodiment may further include the case where the overall size of the patch layer of the basic electromagnetic unit is enlarged according to a preset proportion so that the transformed electromagnetic unit is formed; and/or the overall size of the basic electromagnetic unit is enlarged according to a preset proportion so that the transformed electromagnetic unit is formed. Exemplarily, an electromagnetic unit 60 is the basic electromagnetic unit in FIG. 6, and the overall size of the patch layer of the basic electromagnetic unit 60 is enlarged according to a preset proportion so that a transformed electromagnetic unit 61 is formed; and/or the overall size of the basic electromagnetic unit 60 is enlarged according to a preset proportion so that a transformed electromagnetic unit 61 is formed.

The overall size of the patch layer of a basic electromagnetic unit is enlarged or reduced according to a preset proportion so that a transformed electromagnetic unit is formed; and/or the overall size of a basic electromagnetic unit is enlarged or reduced according to a preset proportion so that a transformed electromagnetic unit is formed. The transformed electromagnetic unit and the basic electromagnetic unit have different geometric shapes to form an intelligent surface having M types of electromagnetic units. Therefore, the capability of the intelligent surface for manipulating spatial electromagnetic wave signals is improved, and thus an intelligent surface with the greatly improved capability of manipulating the spatial electromagnetic wave signals and the spatial electromagnetic environment is implemented. Moreover, the transformed electromagnetic unit is obtained by deforming the basic electromagnetic unit, thus the complexity of designing different types of electromagnetic units is reduced.

In an embodiment, on the basis of the preceding technical schemes, the M types of electromagnetic units include P types of basic electromagnetic units and Q types of transformed electromagnetic units, where $P \geq 1$, $Q \geq 1$ and $P+Q=M$, or $P=M$ and $Q=0$. A transformed electromagnetic unit is formed by partially changing the shape of the patch layer of a basic electromagnetic unit, where partially changing the shape of the patch layer of the basic electromagnetic unit includes at least one of the following: partially changing the length of the patch layer, partially changing the width of the patch layer, partially changing the curvature of the patch layer, or partially changing the radius of the patch layer.

Referring to FIG. 3C, the value of P is 1, and the value of Q is 8. The electromagnetic unit 50 is a basic electromagnetic unit, and the electromagnetic unit 51, the electromagnetic unit 52A, the electromagnetic unit 52B, the electromagnetic unit 52C, the electromagnetic unit 53A, the electromagnetic unit 53B, the electromagnetic unit 53C and the electromagnetic unit 54 are transformed electromagnetic units. The electromagnetic unit 53A is formed by partially changing the curvature and the radius of the patch layer of the electromagnetic unit 50.

On the basis of partially changing the curvature and the radius of the patch layer of the electromagnetic unit 50, the electromagnetic unit 53B and the electromagnetic unit 53C are formed by further rotating the electromagnetic unit 50 by preset angles relative to the center of the electromagnetic unit 50.

On the basis of partially changing the curvature and the radius of the patch layer of the electromagnetic unit 50 and reducing the overall size of the patch layer of the electromagnetic unit 50 according to a preset proportion, the electromagnetic unit 50 is further rotated by 900 counterclockwise relative to the center of the electromagnetic unit 50 so that the electromagnetic unit 54 is formed.

The shape of the patch layer of the basic electromagnetic unit is partially changed to form the transformed electromagnetic unit, so that the intelligent surface including the M types of electromagnetic units is formed. Therefore, the capability of the intelligent surface for manipulating spatial electromagnetic wave signals is improved, and thus an intelligent surface with the greatly improved capability of manipulating the spatial electromagnetic wave signals and the spatial electromagnetic environment is implemented. In addition, an intelligent surface with the same number of electromagnetic units can have a stronger manipulation capability, and the intelligent surface in the embodiment also has the effect of reducing production costs. Moreover, the transformed electromagnetic unit is obtained by the deformation of the basic electromagnetic unit, so that the complexity of designing different types of electromagnetic units is reduced.

In an embodiment, on the basis of the preceding technical schemes, $K_1$ types of electromagnetic units in the P types of basic electromagnetic units and the Q types of transformed electromagnetic units are static electromagnetic units, and $K_2$ types of electromagnetic units in the P types of basic electromagnetic units and the Q types of transformed electromagnetic units are dynamically-reconfigurable electromagnetic units, where $K_1 \geq 0$, $K_2 \geq 0$, and $K_1 + K_2 = P + Q$.

The control manner of the dynamically-reconfigurable electromagnetic units includes the electronic component control, the liquid crystal control and the micro-electromechanical system control. When an electronic component is used for control, the input level of the electronic component may be changed through a control circuit. The electronic component changes the state of the electronic component in response to the input level, thereby adjusting the electromagnetic property of the entire electromagnetic unit. When a liquid crystal is used for control, the voltage difference between two sides of liquid crystal material may be adjusted so that the arrangement state of liquid crystal molecules is changed and thus the dielectric constant of the liquid crystal material is changed; therefore, the electromagnetic property of the entire electromagnetic unit is adjusted. A micro-electromechanical system may be a micro-electromechanical motor or a micro-electromechanical switch. The input level of the micro-electromechanical system is changed through a control circuit, and the micro-electromechanical system changes the state of the micro-electromechanical system in response to the input level, thereby adjusting the electromagnetic property of the entire electromagnetic unit. The micro-electromechanical motor may change the rotation direction and rotation speed of the output shaft in response to the input level, and the micro-electromechanical switch may change the internal connection state of the electromagnetic unit, so that the electromagnetic property of the entire electromagnetic unit is adjusted. Electromagnetic units with different properties have different manipulation effects on an incident electromagnetic wave signal, that is, change amounts in at least one of the four properties, including the phase, the amplitude, the polarization direction or the frequency, of the electromagnetic wave signal are different. Once the preparation of a static electromagnetic unit is completed, properties of the electromagnetic unit cannot be changed, and the change amounts in at least one of the four properties, that is, the phase, the amplitude, the polarization direction or the frequency, of the electromagnetic wave signal cannot be changed.

Electromagnetic units with different geometric shapes have different properties and different manipulation effects on the incident electromagnetic wave signal, that is, change amounts in at least one of the four properties, namely, the phase, the amplitude, the polarization direction or the frequency, of the electromagnetic wave signals are different.

On the basis that the intelligent surface includes the M types of electromagnetic units having different geometric shapes, the electromagnetic units of the intelligent surface may include $K_1$ types of static electromagnetic units and $K_2$ types of dynamically-reconfigurable electromagnetic units. Therefore, the capability of the intelligent surface for manipulating spatial electromagnetic wave signals is further improved, and thus an intelligent surface with the greatly improved capability of manipulating the spatial electromagnetic wave signals and the spatial electromagnetic environment is implemented.

In an embodiment, on the basis of the preceding technical schemes, the P types of basic electromagnetic units and the Q types of transformed electromagnetic units have K different reflectivities or transmissivities, where $1 \leq K \leq P + Q$.

Referring to FIG. 2A to FIG. 2D, the reflectivity or the transmissivity of an electromagnetic unit is changed by selecting a dielectric material layer 2 having a different dielectric constant, in combination with the ground plate 3, electromagnetic units having different reflectivities and transmissivities may be formed, and this combination is particularly applicable to manipulating the electromagnetic signal amplitude.

Electromagnetic units with different geometric shapes have different properties and different manipulation effects on the incident electromagnetic wave signals, that is, change amounts in at least one of the four properties, namely, the phase, the amplitude, the polarization direction or the frequency, of the electromagnetic wave signals are different. On the basis that the intelligent surface includes the M types of electromagnetic units having different geometric shapes, the P types of basic electromagnetic units and the Q types of transformed electromagnetic units have K different reflectivities or transmissivities. Thus, the capability of the intelligent surface for manipulating the spatial electromagnetic wave signals is improved, and thus an intelligent surface with the greatly improved capability of manipulating the spatial electromagnetic wave signals and the spatial electromagnetic environment is implemented.

In an embodiment, on the basis of the preceding technical schemes, $K_3$ types of electromagnetic units in the P types of basic electromagnetic units and the Q types of transformed electromagnetic units are active electromagnetic units capable of emitting electromagnetic signals, and $K_4$ types of electromagnetic units in the P types of basic electromagnetic units and the Q types of transformed electromagnetic units are passive electromagnetic units incapable of emitting electromagnetic signals, where $K_3 \geq 0$, $K_4 \geq 0$, and $K_3 + K_4 = P + Q$.

Electromagnetic units with different geometric shapes have different properties and different manipulation effects on the incident electromagnetic wave signal, that is, change amounts in at least one of the four properties, namely, the phase, the amplitude, the polarization direction or the frequency, of the electromagnetic wave signals are different. On the basis that the intelligent surface includes the M types of electromagnetic units having different geometric shapes, $K_3$ types of electromagnetic units in the P types of basic electromagnetic units and the Q types of transformed electromagnetic units are active electromagnetic units capable of emitting electromagnetic signals, and $K_4$ types of electromagnetic units in the P types of basic electromagnetic units and the Q types of transformed electromagnetic units are passive electromagnetic units incapable of emitting electromagnetic signals. Therefore, on the basis that an intelligent surface with the greatly improved capability of manipulating spatial electromagnetic wave signals and the spatial electromagnetic environment is implemented while the intelligent surface is capable of emitting electromagnetic wave signals, the cost of the entire intelligent surface is reduced due to a relatively low cost of passive electromagnetic units.

To ensure the stable manipulation capability of the intelligent surface, the spacing between an electromagnetic unit in the embodiment of the present application and an adjacent electromagnetic unit on the plane where the intelligent surface is located may be determined according to the electromagnetic unit type to which the electromagnetic unit belongs.

In an embodiment, on the basis of the preceding technical schemes, the spacing between adjacent electromagnetic units is determined by a unit spacing matrix D. The unit spacing matrix D is an M*M two-dimensional matrix, and an element $d_{ij}$ in an $i^{th}$ row and a $j^{th}$ column of the unit spacing matrix D is used for determining the spacing between an $i^{th}$ type electromagnetic unit and a $j^{th}$ type electromagnetic unit when the $i^{th}$ type electromagnetic unit and the $j^{th}$ type electromagnetic unit are arranged adjacently.

The spacing between adjacent electromagnetic units is determined according to the unit spacing matrix D, so that an intelligent surface with the spacing satisfying preset rules can be prepared quickly, and the impact on the manipulation effect of electromagnetic wave signals due to the mutual interference between electromagnetic units is avoided. Therefore, an intelligent surface having a stable manipulation capability is implemented.

Figure 4:
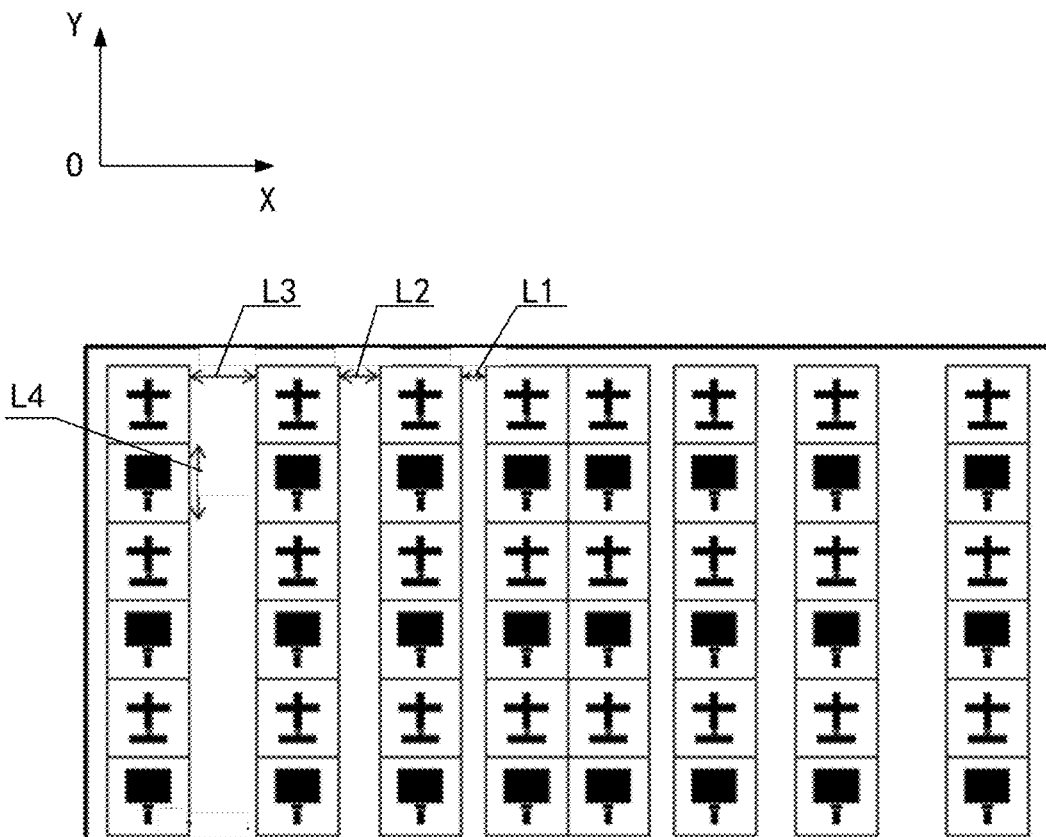
FIG. 4 is a structural diagram of another intelligent surface according to an embodiment of the present application.

FIG. 4 is a structural diagram of another intelligent surface according to an embodiment of the present application. In an embodiment, on the basis of the preceding technical schemes, referring to FIG. 4, in a first direction on the plane where the intelligent surface is located, electromagnetic units of the same type are arranged at an equal spacing; and in a second direction on the plane where the intelligent surface is located, electromagnetic units of the same type are arranged at unequal spacings, where the second direction and the first direction forms a preset included angle.

Exemplarily, referring to FIG. 4, in the first direction, that is, the Y direction, on the plane where the intelligent surface is located, electromagnetic units of the same type are arranged at an equal spacing, that is, fourth spacing L4. In the second direction, that is, the X direction, on the plane where the intelligent surface is located, electromagnetic units of the same type are arranged at unequal spacings, namely, first spacing L1, second spacing L2 and third spacing L3. The first spacing L1, the second spacing L2 and the third spacing L3 are not equal. Exemplarily, the first direction and the second direction in FIG. 4 are perpendicular to each other. However, the value of the included angle between the first direction and the second direction is not limited in the embodiment. Exemplarily, the electromagnetic wave wavelength is λ, the first spacing L1 is 0.1λ, the second spacing L2 is 0.2λ, the third spacing L3 is 0.4λ, and the fourth spacing L4 is 0.54λ.

According to the preceding technical schemes, electromagnetic units of the same type are arranged at different spacings in the second direction, so that more combinations of manipulation effects can be formed to achieve an intelligent surface with a more precise manipulation capability.

Arrangement manners of different types of electromagnetic units on the intelligent surface are described in detail below.

Figure 5:
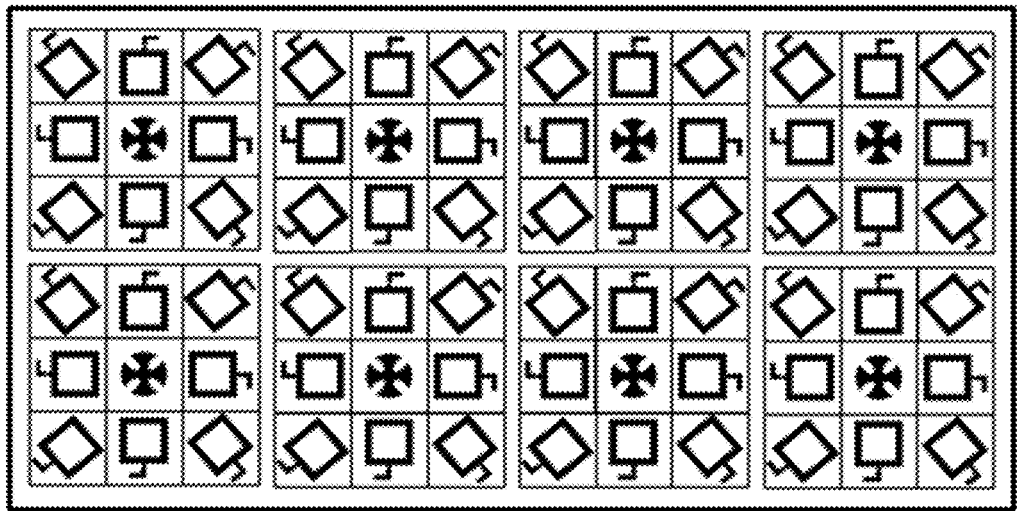
FIG. 5 is a structural diagram of another intelligent surface according to an embodiment of the present application.

FIG. 5 is a structural diagram of another intelligent surface according to an embodiment of the present application. In an embodiment, on the basis of the preceding technical schemes, $K_{12}$ types of electromagnetic units in the M types of electromagnetic units are arranged in block-shaped regions, $K_{13}$ types of electromagnetic units in the M types of electromagnetic units are arranged in an alternating manner, and $K_{14}$ types of electromagnetic units in the M types of electromagnetic units are arranged in a linear manner, where $K_{12} \geq 0$, $K_{13} \geq 0$, $K_{14} \geq 0$, and $K_{12}+K_{13}+K_{14}=M$. Electromagnetic units in each block-shaped region are of the same type; two adjacent electromagnetic units in the $K_{13}$ types of electromagnetic units arranged in the alternating manner are of different types; and electromagnetic units in the same linear region are of the same type. A linear region includes at least one of a rectilinear shaped region, a curvilinear shaped region or an annular region.

Referring to FIG. 3A, the M types of electromagnetic units in the intelligent surface are arranged in two block-shaped regions. Referring to FIG. 5, the M types of electromagnetic units in the intelligent surface are arranged in the alternating manner, and two adjacent electromagnetic units have different types. Referring to FIG. 4, the M types of electromagnetic units in the intelligent surface are arranged in linear regions along the X direction, and the linear regions shown in FIG. 4 are rectilinear. Moreover, the linear region in the embodiments of the present application may further include the curvilinear shaped region or the annular region.

Electromagnetic units with at least one of different geometric shapes, different manipulation manners or types different of electromagnetic parameters manipulated by electromagnetic units have different properties and thus have different manipulation effects on an incident electromagnetic wave signal, that is, change amounts in at least one of the four properties, namely, the phase, the amplitude, the polarization direction or the frequency, of the electromagnetic wave signal are different. Different types of electromagnetic units are arranged in at least one of the following manners: the block-shaped region arrangement, the alternating arrangement or the linear arrangement. Based on the arrangement manner, electromagnetic units in the same region are combined to form an electromagnetic unit group, which facilitates the manipulation according to the electromagnetic unit group and can reduce the complexity of the intelligent surface manipulation method.

To further improve the manipulation capability of the intelligent surface, an embodiment of the present application further provides the technical schemes described below.

In an embodiment, on the basis of the preceding technical schemes, the M types of electromagnetic units are arranged in M layers on the intelligent surface, and electromagnetic units of the same type are arranged in the same layer.

Electromagnetic units of the same type are arranged in the same layer so that the process difficulty of the intelligent surface is reduced, and the preparation of electromagnetic units of the same type can be quickly completed. Exemplarily, in the intelligent surface shown in FIG. 7A, electromagnetic units 70 on an upper layer and electromagnetic units 71 on a lower layer form an electromagnetic unit array. An electromagnetic unit 70 includes a patch layer 701 and a dielectric material layer 702, and an electromagnetic unit 71 includes a patch layer 711 and a dielectric material layer 712; and the lowest layer is a ground plate 72. The intelligent surface shown in FIG. 7B also uses two types of electromagnetic units arranged in layers as FIG. 7A to form an array, but uses a different arrangement manner. On the one hand, the spacing between electromagnetic units is increased in the horizontal direction, and on the other hand, centers of electromagnetic units in the vertical direction are not on the same vertical line, but staggered by a certain distance. Compared with the intelligent surface in FIG. 7A, this intelligent surface can reduce the interference of the electromagnetic units of the upper layer to the manipulation effect of the electromagnetic units of the lower layer.

In an embodiment, on the basis of the preceding technical schemes, the M types of electromagnetic units constitute M electromagnetic unit groups, and each electromagnetic unit group includes one type of electromagnetic units. Alternatively, the M types of electromagnetic units constitute N electromagnetic unit groups, and each electromagnetic unit group includes at least two types of electromagnetic units, where N is an integer less than or equal to M.

Each electromagnetic unit group includes one type of electromagnetic units, and one electromagnetic unit group may be uniformly manipulated, so that the method for controlling the intelligent surface is simplified. Alternatively, the M types of electromagnetic units constitute N electromagnetic unit groups, and each electromagnetic unit group includes at least two types of electromagnetic units, so that the manipulation capability of each electromagnetic unit group can be improved, and thus the manipulation capability of the entire intelligent surface is improved. Exemplarily, for the division of electromagnetic unit groups, according to a specific manipulation target, electromagnetic units arranged in the same block-shaped region, electromagnetic units of the same type which are arranged in the alternating manner, and electromagnetic units arranged in the same linear region may be divided into one group; or electromagnetic units arranged in adjacent or non-adjacent block-shaped regions, electromagnetic units arranged adjacently or non-adjacently in the alternating manner, and electromagnetic units arranged in adjacent or non-adjacent linear regions may be divided into one group.

The intelligent surface manipulation method is described below. In an embodiment, on the basis of the preceding technical schemes, an electromagnetic unit group receives a control instruction from a controller to change the state of electromagnetic units within this group and manipulate an incident electromagnetic wave.

Regardless of different electromagnetic units having the same type or different types, according to the group into which an electromagnetic unit is divided, the to-be-adjusted electromagnetic property parameter of the incident electromagnetic wave is adjusted in a unified response to a control instruction with the electromagnetic unit group as a unit. The more the electromagnetic unit groups and the more the types of electromagnetic units within each group, the more significant the effect generated by the capability of the intelligent surface for manipulating the incident electromagnetic waves and the spatial electromagnetic environment.

An embodiment of the present application further provides a method for controlling an intelligent surface. The method for controlling an intelligent surface includes the following:

In 110, a target electromagnetic unit that needs to receive a control instruction is acquired according to a manipulation target of an intelligent surface for an electromagnetic wave and a table of mapping relationships between pre-stored adjustment functions and pre-stored control instructions.

A mathematical model may be established according to the position of a base station, the position of a terminal, the number and positions of intelligent surfaces, incident electromagnetic wave signals, and outgoing electromagnetic wave signals in a communication system where the intelligent surface is located, and the table of mapping relationships between the pre-stored adjustment functions and the pre-stored manipulation instructions is obtained.

In 120, each electromagnetic unit group is determined according to the target electromagnetic unit.

In 130, a control instruction received by each electromagnetic unit group is determined according to each electromagnetic unit group.

In 140, according to the control instruction received by each electromagnetic unit group, each electromagnetic unit group is controlled to receive a control instruction from a controller to change the state of electromagnetic units within the group and to manipulate an incident electromagnetic wave.

In an embodiment, the number of target electromagnetic units that need to be controlled is less than or equal to the number of electromagnetic units included in the intelligent surface, the number of types of target electromagnetic units that need to be controlled is less than or equal to the number of types of electromagnetic units included in the intelligent surface, and the number of electromagnetic units included in each type of target electromagnetic units that need to be controlled is less than or equal to the number of electromagnetic units included in each type of electromagnetic units included in the intelligent surface.

Figure 8:
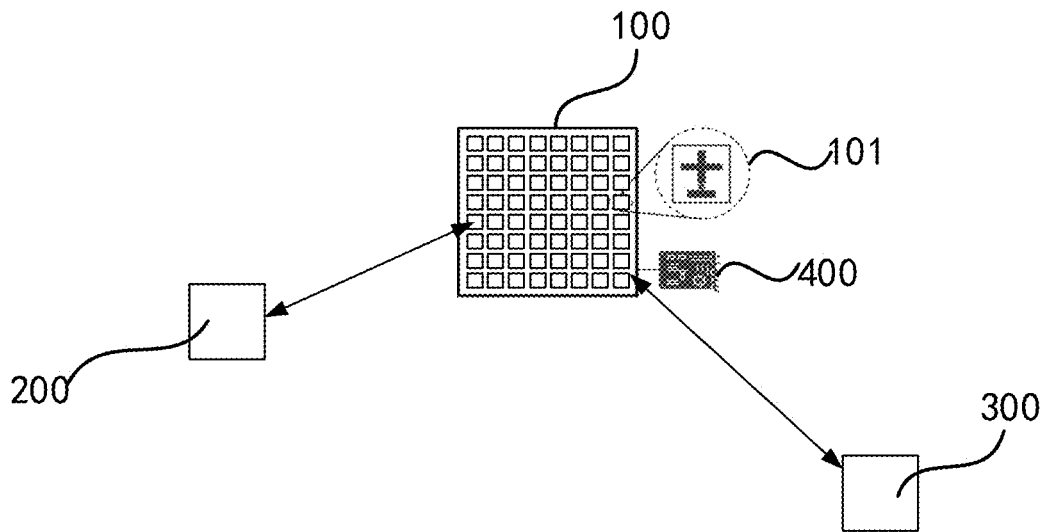
FIG. 8 is a structural diagram of a spatial electromagnetic wave manipulation system according to an embodiment of the present application.

An embodiment of the present application further provides a spatial electromagnetic wave manipulation system. FIG. 8 is a structural diagram of a spatial electromagnetic wave manipulation system according to an embodiment of the present application. Referring to FIG. 8, the spatial electromagnetic wave manipulation system includes any preceding intelligent surface 100 in the preceding technical schemes, and further includes a first node 200 and a second node 300. The first node 200 is configured to emit electromagnetic wave signals to space and/or receive electromagnetic wave signals from space, and the second node 300 is configured to emit electromagnetic wave signals to space and/or receive electromagnetic wave signals from space. The intelligent surface 100 is configured to manipulate electromagnetic wave signals emitted by the first node 200 and reflect or transmit the manipulated electromagnetic wave signals to the second node 300; and/or the intelligent surface 100 is further configured to manipulate electromagnetic wave signals emitted by the second node 300 and reflect or transmit the manipulated electromagnetic wave signals to the first node 200.

An electromagnetic unit 101 of the intelligent surface 100 is composed of a specific shape of metal or dielectric material and is connected to an electronic component. The electronic component is controlled by a controller 400 on the surface, so that the adjustment of the electromagnetic property (such as average magnetic permeability and an average dielectric constant) of the electromagnetic unit is achieved. The electronic component includes a resistor, a capacitor, a diode, a triode, etc. A varactor diode may implement multilevel phase control.

The spatial electromagnetic wave manipulation system provided in the embodiment of the present application includes any intelligent surface 100 of the preceding technical schemes. The intelligent surface 100 includes at least two types of electromagnetic units 101; compared with an intelligent surface including only one type of electromagnetic units, the technology in the embodiment can provide more combinations of change amounts in at least one of the four properties, that is, the phase, the amplitude, the polarization direction or the frequency, of electromagnetic wave signals. Moreover, with the increase in the types of electromagnetic units and different arrangement manners of different types of electromagnetic units on the intelligent surface, the intelligent surface can perform more precise manipulation on at least one of the phase, the amplitude, the polarization direction or the frequency of electromagnetic wave signals, so that the capability of the intelligent surface for manipulating the spatial electromagnetic wave signals is improved, and thus a spatial electromagnetic wave manipulation system with the greatly improved capability of manipulating the spatial electromagnetic wave signals and the spatial electromagnetic environment is implemented.

In an embodiment, on the basis of the preceding technical schemes, the first node 200 includes a wireless base station and/or an energy emitting device, and the second node 300 includes a mobile terminal and/or an energy receiving device. Alternatively, the second node 300 includes a wireless base station and/or an energy emitting device, and the first node 200 includes a mobile terminal and/or an energy receiving device.

The preceding technical schemes implement one or more of a spatial electromagnetic wave manipulation system composed of a mobile terminal, the intelligent surface 100 and an energy receiving device, a spatial electromagnetic wave manipulation system composed of a mobile terminal, the intelligent surface 100 and a mobile terminal, and a spatial electromagnetic wave manipulation system composed of an energy receiving device, the intelligent surface 100 and an energy receiving device, so that the composition diversity of the spatial electromagnetic wave manipulation system is achieved.

It should be understood by those skilled in the art that functional modules/units in all or part of the steps of the method, the system and the apparatus disclosed above may be implemented as software, firmware, hardware and appropriate combinations thereof.

In the hardware implementation, the division of the functional modules/units mentioned in the above description may not correspond to the division of physical components. For example, one physical component may have several functions, or one function or step may be implemented jointly by several physical components. Some or all physical components may be implemented as software executed by processors such as central processing units, digital signal processors or microcontrollers, hardware, or integrated circuits such as application-specific integrated circuits. Such software may be distributed on a computer-readable medium, which may include a computer storage medium (or a non-transitory medium) and a communication medium (or a transitory medium). As is known to those of ordinary skill in the art, the term, computer storage medium, includes volatile and nonvolatile, removable and non-removable media implemented in any method or technology for storing information (such as computer-readable instructions, data structures, program modules or other data). The computer storage medium includes, but is not limited to, a random-access memory (RAM), a read-only memory (ROM), an electrically erasable programmable read-only memory (EE-PROM), a flash memory or other memory technologies, a compact disc read-only memory (CD-ROM), a digital video disk (DVD) or other optical disc storage, a magnetic cassette, a magnetic tape, disk storage or other magnetic storage apparatuses, or any other medium used for storing desired information and accessible by a computer. In addition, as is known to those of ordinary skill in the art, the communication medium generally includes computer-readable instructions, data structures, program modules or other data in modulated data signals such as carriers or other transmission mechanisms, and may include any information delivery medium.

What is claimed is:

1. An intelligent surface, comprising:
M types of electromagnetic units, wherein M is greater than or equal to 2;
wherein types of the M types of electromagnetic units are distinguished by at least one of a geometric shape of an electromagnetic unit, a manipulation manner of an electromagnetic unit or a type of an electromagnetic parameter manipulated by an electromagnetic unit;
wherein the M types of electromagnetic units comprise P types of basic electromagnetic units and Q types of transformed electromagnetic units, wherein $P \geq 1$, $Q \geq 1$ and $P+Q=M$; and wherein in the P types of basic electromagnetic units and the Q types of transformed electromagnetic units, $K_1$ types of electromagnetic units are static electromagnetic units, and $K_2$ types of electromagnetic units are dynamically-reconfigurable electromagnetic units, wherein $K_1 > 0$, $K_2 > 0$, and $K_1 + K_2 = P+Q$; or in the P types of basic electromagnetic units and the Q types of transformed electromagnetic units, $K_3$ types of electromagnetic units are active electromagnetic units which are capable of emitting electromagnetic signals, and $K_4$ types of electromagnetic units are passive electromagnetic units which are incapable of emitting electromagnetic signals, wherein $K_3 > 0$, $K_4 > 0$, and $K_3 + K_4 = P+Q$; and wherein
a basic electromagnetic unit in the P types of basic electromagnetic units forms a transformed electromagnetic unit in the Q types of transformed electromagnetic units in at least one of the following manners: rotating the basic electromagnetic unit by a preset angle relative to a center of the basic electromagnetic unit to form the transformed electromagnetic unit; or mirror-flipping the basic electromagnetic unit relative to a preset flipping axis on a plane where the basic electromagnetic unit is located to form the transformed electromagnetic unit;
a basic electromagnetic unit in the P types of basic electromagnetic units forms a transformed electromagnetic unit in the Q types of transformed electromagnetic units in at least one of the following manners: enlarging or reducing an overall size of a patch layer of the basic electromagnetic unit according to a preset proportion to form the transformed electromagnetic unit; or enlarging or reducing an overall size of the basic electromagnetic unit according to a preset proportion to form the transformed electromagnetic unit; or
a transformed electromagnetic unit in the Q types of transformed electromagnetic units is formed by partially changing a shape of a patch layer of a basic electromagnetic unit in the P types of basic electromagnetic units, wherein partially changing the shape of the patch layer of the basic electromagnetic unit comprises at least one of the following: partially changing a length of the patch layer, partially changing a width of the patch layer, partially changing curvature of the patch layer, or partially changing a radius of the patch layer.

2. The intelligent surface according to claim 1, wherein the M types of electromagnetic units comprise $K_5$ types of electromagnetic units configured to be controlled by an electronic component, $K_6$ types of electromagnetic units configured to be controlled by a liquid crystal and $K_7$ types of electromagnetic units configured to be controlled by a micro-electromechanical system, wherein $K_5 \geq 0$, $K_6 \geq 0$, $K_7 \geq 0$, and $K_5 + K_6 + K_7 = M$.

3. The intelligent surface according to claim 1, wherein the M types of electromagnetic units comprise $K_8$ types of electromagnetic units for manipulating an electromagnetic wave amplitude, $K_9$ types of electromagnetic units for manipulating an electromagnetic wave phase, $K_{10}$ types of electromagnetic units for manipulating an electromagnetic wave frequency and $K_{11}$ types of electromagnetic units for manipulating an electromagnetic wave polarization direction, wherein $K_8 \geq 0$, $K_9 \geq 0$, $K_{10} \geq 0$, $K_{11} \geq 0$, and $K_8 + K_9 + K_{10} + K_{11} = M$.

4. The intelligent surface according to claim 1, wherein a spacing between adjacent electromagnetic units in the M types of electromagnetic units is determined by a unit spacing matrix, wherein the unit spacing matrix is an M*M two-dimensional matrix, and an element $d_{ij}$ in an $i^{th}$ row and a $j^{th}$ column of the unit spacing matrix is used for determining a spacing between an $i^{th}$ type electromagnetic unit in the M types of electromagnetic units and a $j^{th}$ type electromagnetic unit in the M types of electromagnetic units in a case where the $i^{th}$ type electromagnetic unit and the $j^{th}$ type electromagnetic unit are arranged adjacently.

5. The intelligent surface according to claim 4, wherein in a first direction on a plane where the intelligent surface is located, electromagnetic units of a same type are arranged at an equal spacing; and in a second direction on the plane where the intelligent surface is located, electromagnetic units of a same type are not arranged at an equal spacing, wherein the second direction and the first direction form a preset included angle.

6. The intelligent surface according to claim 1, wherein in the M types of electromagnetic units, $K_{12}$ types of electromagnetic units are arranged in block-shaped regions, $K_{13}$ types of electromagnetic units are arranged in an alternating manner, and $K_{14}$ types of electromagnetic units are arranged in a linear manner, wherein $K_{12} \geq 0$, $K_{13} \geq 0$, $K_{14} \geq 0$, and $K_{12} + K_{13} + K_{14} = M$;

electromagnetic units in each of the block-shaped regions are of a same type;

in the $K_{13}$ types of electromagnetic units, two adjacent electromagnetic units are of different types; and in the $K_{14}$ types of electromagnetic units, electromagnetic units in a same linear region are of a same type, wherein a linear region comprises at least one of a rectilinear shaped region, a curvilinear shaped region or an annular region.

7. The intelligent surface according to claim 1, wherein the M types of electromagnetic units are arranged in M layers on the intelligent surface, and electromagnetic units of a same type in the M types of electromagnetic units are arranged in a same layer of the M layers.

8. The intelligent surface according to claim 1, wherein the M types of electromagnetic units constitute M electromagnetic unit groups, and each of the M electromagnetic unit groups comprises one type of the M types of electromagnetic units; or the M types of electromagnetic units constitute N electromagnetic unit groups, and each of the N electromagnetic unit groups comprises at least two types of the M types of electromagnetic units, wherein N is an integer less than or equal to M.

9. The intelligent surface according to claim 8, wherein an electromagnetic unit group is configured to receive a control instruction from a controller to change a state of electromagnetic units within the electromagnetic unit group and manipulate an incident electromagnetic wave.

10. A spatial electromagnetic wave manipulation system, comprising the intelligent surface of claim 1 and a first node and a second node, wherein the first node is configured to perform at least one of the following: emitting an electromagnetic wave signal to space or receiving an electromagnetic wave signal from space, and the second node is configured to perform at least one of the following: emitting an electromagnetic wave signal to space or receiving an electromagnetic wave signal from space;

wherein the intelligent surface is configured to perform at least one of the following: manipulating an electromagnetic wave signal emitted by the first node and reflecting or transmitting the manipulated electromagnetic wave signal to the second node; or manipulating an electromagnetic wave signal emitted by the second node and reflecting or transmitting the manipulated electromagnetic wave signal to the first node.

11. The spatial electromagnetic wave manipulation system according to claim 10, wherein the first node comprises at least one of: a wireless base station or an energy emitting device, and the second node comprises at least one of: a mobile terminal or an energy receiving device; or the second node comprises at least one of: a wireless base station or an energy emitting device, and the first node comprises at least one of: a mobile terminal or an energy receiving device.

12. The intelligent surface according to claim 1, wherein the P types of basic electromagnetic units and the Q types of transformed electromagnetic units have K different reflectivities or transmissivities, wherein $1 \leq K \leq P + Q$.

* * * * *